July 12, 1927.
F. W. PICHÉ
1,635,727
BRAKE MECHANISM
Filed March 5, 1925
3 Sheets-Sheet 1
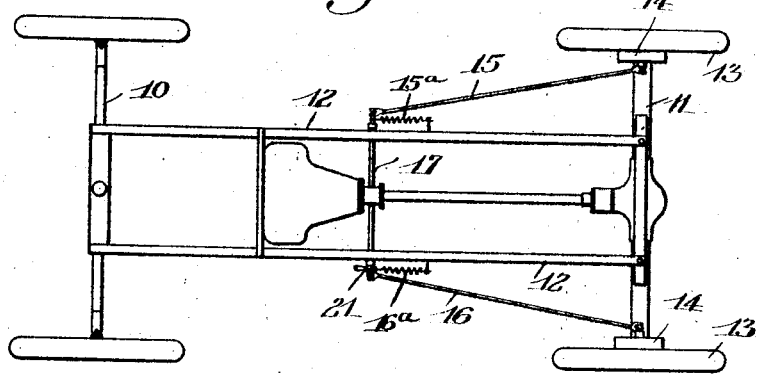
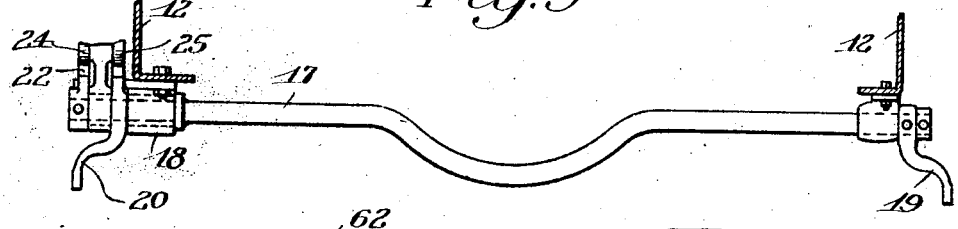
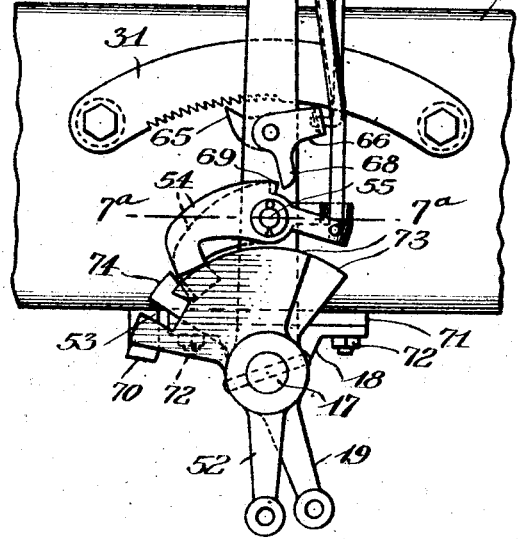
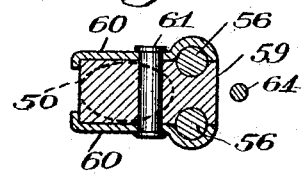
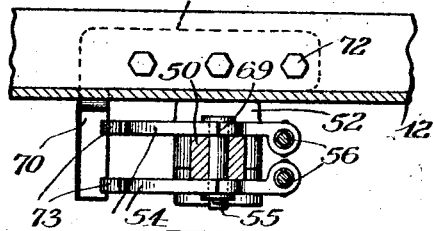
INVENTOR.
Frank W. Piché
BY
his ATTORNEY

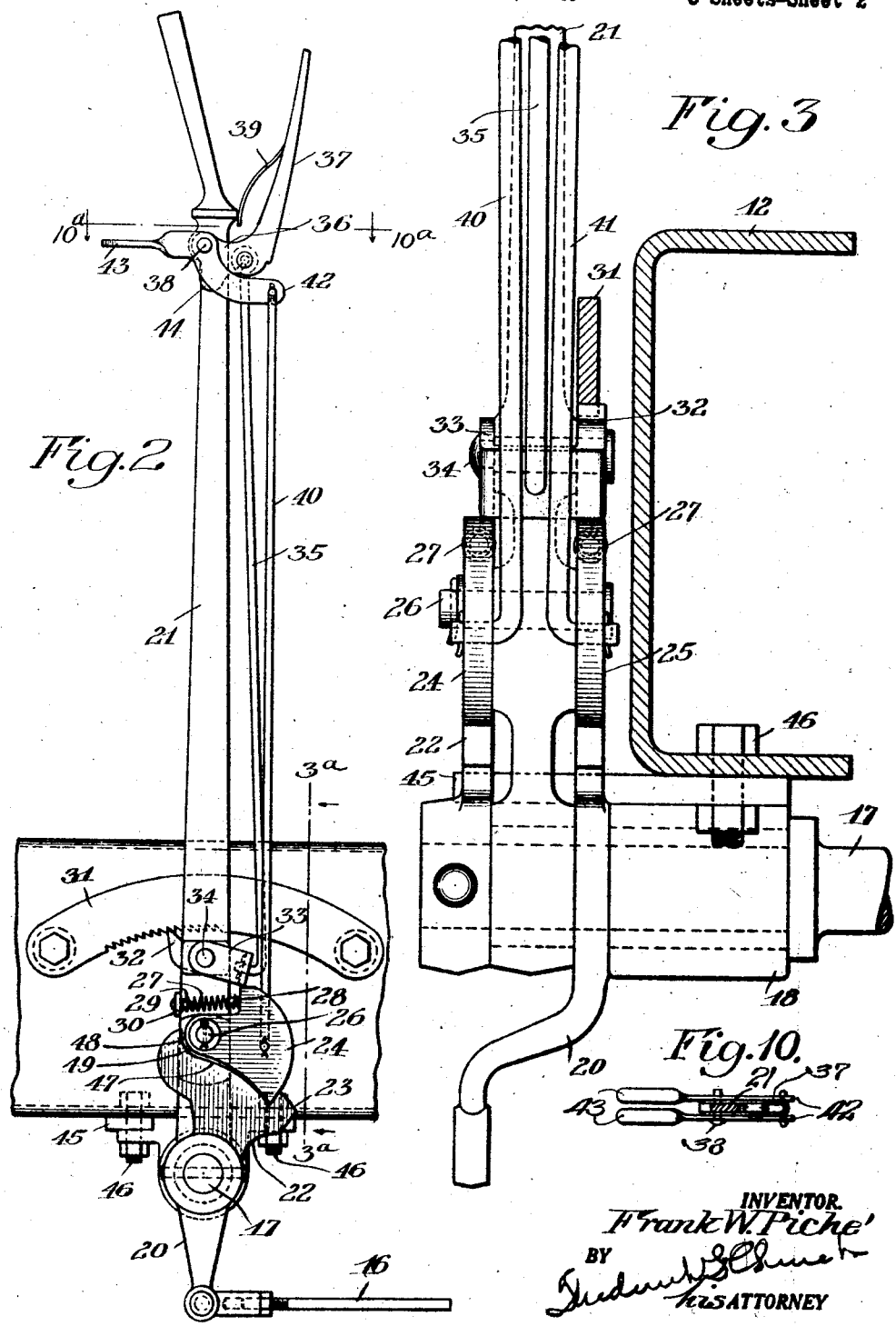

July 12, 1927. 1,635,727
F. W. PICHÉ
BRAKE MECHANISM
Filed March 5, 1925  3 Sheets-Sheet 3

INVENTOR.
Frank W. Piché
BY
his ATTORNEY

Patented July 12, 1927.

1,635,727

UNITED STATES PATENT OFFICE.

FRANK W. PICHÉ, OF DETROIT, MICHIGAN.

BRAKE MECHANISM.

Application filed March 5, 1925. Serial No. 13,059.

This invention relates to brake mechanism and more particularly to an improved selective brake control mechanism for the tractive members of a motor vehicle where individual braking is required as when one of the tractor wheels or members has lost effective engagement with the ground.

The invention further has for its object to provide a simple, practical and comparatively inexpensive brake mechanism of the selective type for braking the tractive wheels of a vehicle either simultaneously, as in controlling the speed of a vehicle or for selective or individual braking of the wheels as may be found advantageous under certain conditions of service.

Another object of the invention is to provide, in a selective brake mechanism for motor vehicles, improved means for preventing locking of either brake in service position, thus making it unnecessary to rely on the memory of the driver to effect unlocking or individual release of the brakes when one or the other has been applied.

To these and other ends the invention resides in certain improvements and combinations of parts, all as will be hereinafter more fully described, the novel features being pointed out in the claims at the end of the specification.

In the drawings:

Figure 1 is a top plan view illustrating diagramatically the application of the present invention to a vehicle frame;

Figure 2 is a side elevation of the selective brake operating mechanism embodying one form of the invention with the operating member shown in position to effect application of both brakes;

Figure 3 is an enlarged transverse section taken on line 3ª—3ª of Figure 2;

Figure 6 is a view similar to Figure 4 with one brake actuating member in normal release position and the other moved to service position;

Figure 7 is a sectional plan taken on line 7ª—7ª of Figure 6;

Figure 8 is an enlarged sectional plan through the operating lever taken on line 8ª—8ª of Figure 6;

Figure 9 is an enlarged transverse sectional elevation through the vehicle frame illustrating the method of mounting the brake shaft shown in Figure 1;

Figure 10 is a sectional plan taken on line 10ª—10ª of Figure 2.

Similar reference numerals throughout the several views indicate the same parts.

Figure 4:
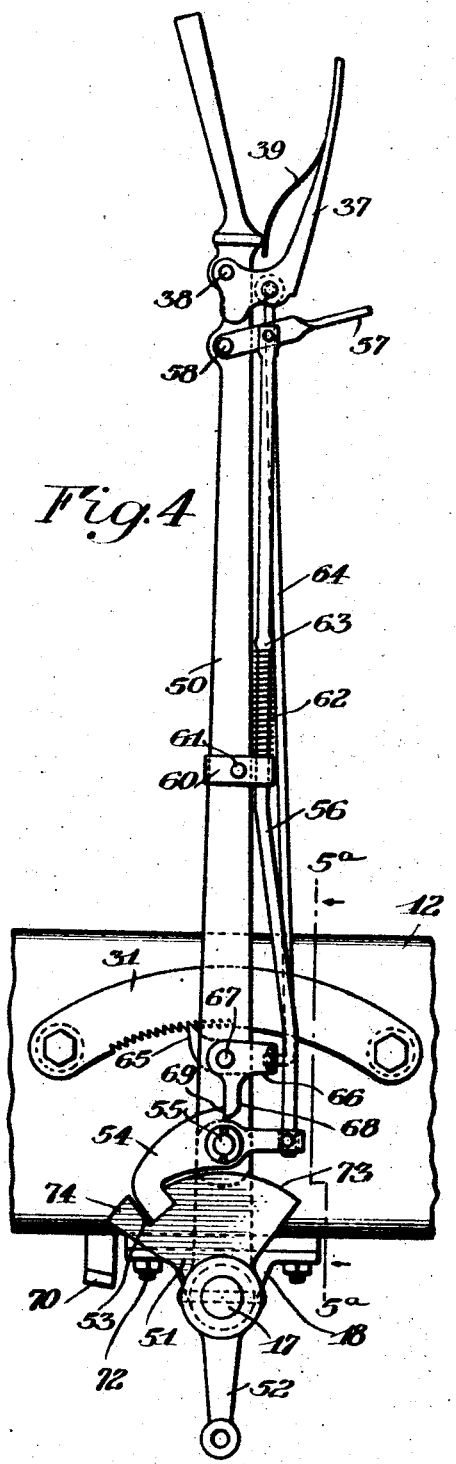
Figure 4 is a side elevation of a modified form of the invention showing the mechanism in position to effect application of both brakes.

The preferred embodiment of the invention shown herein by way of illustration discloses the principles of the invention as applied to a well known type of motor vehicle in which the brakes are applied to the differentially driven rear wheels, from which extend forwardly the usual or any suitable brake connections to a point where the control mechanism is located convenient to the reach of the driver. The invention embodies generally a lever or operating member arranged to be selectively coupled with either of a pair of brake actuating members so that one may be operated independently of the other or both coupled together at the same time to constitute an emergency brake for checking the speed of the vehicle. In this connection means is provided to make it impossible to effect the individual locking of either brake in service position, as when selecting to restrain the drive through one of the wheels and directing the driving force to the other in case one wheel becomes ditched or for any other reason its tractive effort is reduced or rendered insufficient to drive the vehicle.

Referring to the drawings, Figure 1 shows a vehicle frame or chassis including the front and rear axles 10 and 11 for supporting the frame 12 with the usual differential provided for driving the rear wheels 13. Any suitable type of brakes may be applied to the rear wheels such as are indicated at 14, from which brake rods 15 and 16 are extended for connection with the transverse brake shaft 17 supported in suitable bearings 18 secured upon the side frame members 12 as indicated in Figures 3 and 9. The brake rod 15 is connected with an arm or crank 19 rigidly held on one end of the shaft 17, while the rod 16 is connected with the lower end of a lever or brake actuating member 20 which is pivotally mounted upon the opposite end of the shaft as shown in Figures 2 and 3. A lever or operating member 21 is also pivotally mounted upon the shaft at the outside of the brake actuating lever 20 and adjacent the lever is an upstanding arm or crank 22 rigidly secured upon the shaft for operating the same to effect operation of the brake rod 15 and the brake with which it is connected. The upper ends of the lever 20 and crank arm 22 are made identical in form, the construction being clearly indicated in Figure 2. Each of said members is provided with a shoulder 23 forming an abutment for the latch or coupling members 24 and 25 which are pivotally supported upon the opposite sides of the lever 21 by a pin 26 extending therethrough. The latch members are normally held in locking position by springs 27, the rear ends of which are supported by projections 28 on the latch members while their opposite ends are supported by similar projections 29 extending rearwardly from a plate 30, suitably secured to and projecting upon the opposite sides of the lever 21. The lever 21 is locked in the desired position by means of the usual ratchet segment 31 and dog 32, the latter constituting one arm of a U-shaped retainer for the latch members 24 and 25, the other arm 33 being disposed upon the outside of the operating lever and a pin 34 being extended through the lever to form a pivotal support for said retaining member. The retaining member when in locking position as shown in Figure 2, rests upon the top of the latch members 24 and 25 to prevent release of the same, thus making it necessary to first release the dog 32 before release of the latch members can be effected. The retaining member is moved to release position by a latch rod 35, the lower end of which is loosely connected with the middle portion of the retaining member while the upper end of the rod is pivotally disposed between the forks 36 of a pivoted hand grip 37 supported by a pivot pin 38 extending through the lever 21. The hand grip is normally held in position to depress the latch rod 35 by means of a spring 39 mounted as shown in Figure 2. Individual release of the latch members 24 and 25 is effected by the operating rods 40 and 41 respectively, the lower ends of which are turned outwardly and extended through said latch members while their upper ends are preferably turned inwardly and extended through the rear ends of a pair of finger levers 42 carried by the pivot pin 38 and having forwardly extending finger engaging portions 43 as shown in Figure 2. The arms 36 of the hand grip 37 are preferably provided with downwardly extending portions 44 which form finger guides or wearing plates for the finger lever 42. The finger portions 43 of said levers are so positioned that either may be operated in conjunction with the hand grip 37 by the use of one hand when it is desired to release the dog 32, and either of the latch members 24 or 25, according to the brake selected for operation. With either of the latch members 24 or 25 in raised or released position it will be impossible to move the dog 32 to latching position, as can be readily understood, and therefore neither brake can be locked in service position while the other is in release position. Consequently it must be held in service position by the operator when it is found necessary to apply only one brake, for the reasons pointed out above. In normal release position of both brakes the upper end of the lever 20 and the operating arm 22 will rest upon a stop 45 to which position said parts are returned by the brake release springs, 15a and 16a, when the operating lever 21 moves to extreme release position. The stop is preferably in the form of a plate projecting outwardly from the side frame member 12 and is preferably disposed in a recessed portion of the brake shaft bearing 18 and secured by one of the bolts 46 for connecting the bearing with the side frame member 12.

The brake actuating lever 20 and arm 22 are each provided with an upwardly inclined curved portion 47 which terminates in a vertically disposed portion 48, slightly spaced from the latch members 24 and 25, and affording means for positively insuring the release of the brakes upon movement of the operating lever 21 to extreme release position. This arrangement is advantageous in cases where the brake release springs become broken or for other reasons fail to release the brakes at the desired time. With either of the latch members 24 or 25 lifted to release position the same are moved rearwardly with the lever 21 when the latter is operated to apply the brake selected for operation and when pressure upon the finger lever 43 is released the latch member will drop down upon the shoulder 23 beneath the same and ride thereon to latching position when the operating lever is returned to full release position, the springs 27 acting to depress the latch members as soon as they clear the shoulder 23 as will be readily understood. The play indicated at 49 between the front portions of the latch members and the vertical portions 48 of the brake actuating members allows for a slight overrunning of the latch members when the brakes are released, thus insuring return of said latch members to locking position.

Figure 5:
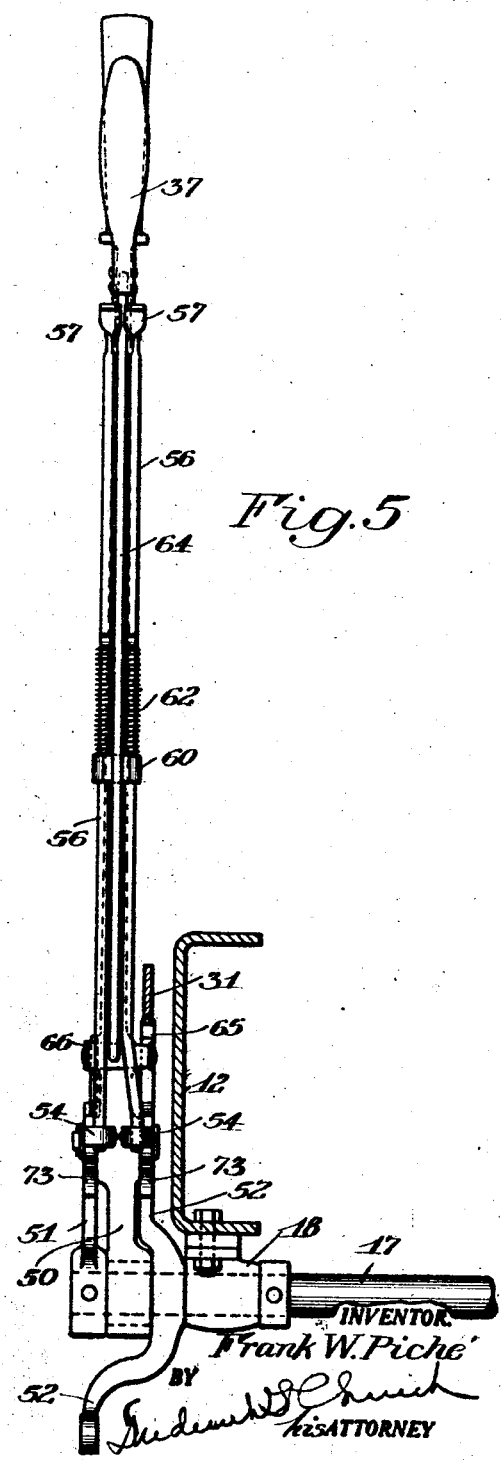
Figure 5 is a transverse section taken on line 5ª—5ª of Figure 4.

In the modification shown in Figures 4 to 8 inclusive the brake shaft 17 and bearings 18 therefor are substantially the same as in the preferred form. Furthermore the principles of operation are the same in both cases, the differences being in the details of construction of certain parts of the selective control mechanism. In Figures 4 to 6 the lever 50 is pivoted upon shaft 17 with the brake actuating members 51 and 52 disposed upon the opposite sides thereof, the latter being in the form of a lever pivoted upon the shaft and the former being fixed thereon and constituting an operating arm for the shaft to effect operation of the brake rod 15 and the brake with which it is connected. The upper ends of the arm 51 and lever 52 are similarly constructed, being provided with notches 53 adapted to receive the latch members 54 disposed upon the opposite sides of the hand lever 50 and supported by a pivot pin 55 extending therethrough. The latch members are provided with operating rods 56 connected at their upper ends with a pair of operating levers 57 disposed upon opposite sides of the hand lever 50 and secured thereon by a pivot pin 58. The rods 56 are guided by a lateral extension 59 of the lever and the plates 60 secured to the lever by the pin 61 as shown in Figure 8. Springs 62 are provided for normally maintaining the latch members 54 in locking position as shown in Figure 4. The lower ends of the springs rest upon the brackets 60 and lateral extension 59 of the hand lever while their upper ends engage the enlarged portions 63 of the rods, the springs being under the desired tension for maintaining the latch members 54 in locking position. The hand grip 37, pivot pin 38 and control spring 39 therefor are the same as shown in Figure 12, the hand grip being provided with a depending control rod 64 for actuating the dog 65 which cooperates with the latch bar 31 in locking the operating member or hand lever in the desired position of adjustment. The dog 65 is carried by a yoke shaped retaining member 66 for the latch member 54, the retaining member being pivoted at 67 upon the hand lever 50 and having downwardly extending lugs 68 adapted to engage behind the shoulder portions 69 of the latch members 54. By this means release of said latch members previous to the release of the dog 65 is prevented and furthermore reengagement of the dog with the latch bar 31 is prevented by either of the latch members 54 when in release position, thus making it impossible to lock either brake in service position when the other is in normal release position. This operation is clearly illustrated in Figure 6 where the lever 52 has been actuated to apply one brake and the arm 51 remains in normal brake release position against its stop 70 which is in the form of an arm projecting from a bracket 71 secured to the side frame member 12 by the bolt 72 as shown in Figure 7. It will be seen as indicated in Figure 6 that with the latch 54 in release position the shoulder 69 thereof will project in the path of the lug 68 on the yoke 66 and thus prevent movement of the dog 65 to locking position and consequently prevent locking of the operating lever 50 and the brake which has been applied by the operator. In order to effect re-engagement of the dog 65 with the latch bar it is necessary to move the lever 50 forwardly until the latch member 54 riding upon the curved portion 73 of the actuating member 51 or 52 as the case may be drops into the notch 53. The shoulder 69 of the latch will then move out of the path of the projection 68 of the yoke 66, thus permitting the dog 65 to reengage the latch bar 31. The members 51 and 52 are each provided with projections 74 extending in the path of the latch member to insure its dropping into the notch 53 when returning the lever 50 to normal release position.

It will be readily understood therefore that with either of the embodiments shown neither brake can be locked in service position while the other is in normal release position and that the dog for latching the operating lever must be released before either of the brake coupling members can be released or in other words before selective operation can take place. However, where it is desired to operate both brakes simultaneously, so as to stop the vehicle in case of emergency, neither of the latch or coupling members 54 will be released but only the dog for holding the operating member.

In the operation of the brake mechanism shown in Figures 1 to 3 inclusive, assuming that the parts are in normal inoperative position and that it is desired to effect application of the right hand brake only as viewed in Figure 1, the driver upon gripping the upper end of lever 21 will first operate the hand grip 37 to release the dog 32 from the latch bar 31 thereby freeing the latch members 24 and 25. The finger lever 42 which is connected to the inner operating rod 41 is then moved to release the latch member 25 from engagement with the brake operating lever 20 which is connected with the left hand brake while the latch member 24 rigid on the shaft 17 is left in operative engagement with the lever 22 so that upon movement of the main operating lever 21 rearwardly from normal release position the shaft 17 will be rotated in a clockwise direction to effect movement of the arm 19 and brake rod 15 whereby to apply the right hand brake. Application of the left hand brake is effected in the same manner except that the latch member 24 is released instead of latch member 25. The latch members 24 and 25 when lifted to release position move rearwardly with the operating lever 21 and when pressure on the finger lever 42 is released said latch members drop down upon the shoulders 23 of the arm and lever 20, respectively, and ride thereon to latching position when the operating lever is returned to full release position, the springs 27 acting to depress the latch members as soon as they clear the shoulders 23. To apply both brakes simultaneously it is only necessary to release the dog 32 and move the main operating lever 21 rearwardly from normal brake release position.

The operation of the modified construction shown in Figures 5, 6 and 7 is the same as that described above, the position of the springs 62 for returning the latch members 54 to locking position being different and the dog 65 having lugs 68 adapted to engage behind the shoulder portion 69 of the latch members 54, release of these parts being effected in the same manner as the corresponding parts in Figures 2 and 3.

I claim as my invention:

1. The combination with a vehicle frame having a pair of traction members and a brake for each of the members, an operating member, selectively operable control devices for coupling the operating member with said brakes and releasable locking means for the operating member adapted when in locking position to prevent selective operation of said control devices whereby neither brake can be locked in service position.

2. The combination with a vehicle frame having a pair of differentially driven traction wheels and a brake for each of the wheels, release means for the brakes, a brake lever, selectively operable control devices adapted to couple the lever with said brakes and latching means for the lever adapted when in latching position to extend in the path of the control devices to prevent selective operation thereof whereby neither brake can be locked in service position.

3. The combination with a vehicle frame having a pair of differentially driven traction wheels, and a brake for each of the wheels, release means for the brakes, a brake lever, selectively operable control members adapted to couple the lever with said brakes, latching means for the lever arranged when in latching position to prevent selective operation of said control members and operating devices for said latching means and said control devices adapted for simultaneous operation by the use of one hand.

4. The combination with a vehicle frame having a pair of traction wheels and a brake for each of the wheels, release means for the brakes, a brake lever, selectively operable control devices adapted to couple the lever with said brakes, latching means for the lever, and operating devices for said latching means and said control devices adapted for simultaneous operation by the use of one hand.

5. The combination with a vehicle frame having a pair of traction wheels and a brake for each of the wheels, a lever, brake actuating members, selectively operable devices adapted to couple said lever with said brake actuating members, a stop for said brake actuating members, and latching means for the lever adapted when in latching position to prevent operation of said selectively operable devices.

6. The combination with a vehicle frame having a pair of traction wheels and a brake for each of the wheels, a brake shaft operatively connected with one of said brakes, a hand lever pivoted upon the shaft, a pair of lever arms upon the shaft one of which is loose thereon and the other fixed thereto and each being provided with a shoulder, selectively operable members for said lever arms normally engaging said shoulders, and releasing means for said selectively operable members including control members disposed at the operating end of said lever.

7. The combination with a vehicle frame having a pair of traction wheels and a brake for each of the wheels, a brake shaft operatively connected with one of said brakes, a hand lever pivoted upon the shaft, a pair of lever arms upon the shaft one of which is loose thereon and the other fixed thereto and each being provided with a shoulder, selectively operable members for said lever arms normally engaging said shoulders, releasing means for said selectively operable members including control members disposed at the operating end of said lever, and latching means for the lever adapted when in latching position to prevent release of said selectively operable members.

8. The combination with a vehicle frame having a pair of traction wheels and a brake for each of the wheels, a brake lever, a pair of pivoted members operatively connected with said brakes, and pivotally mounted devices for selectively coupling the lever with said pivoted members, the latter having portions projecting in the path of said pivotally mounted devices whereby said devices are adapted to positively insure the return of said pivoted members to normal brake releasing position upon movement of the brake lever to release position.

9. The combination with a vehicle frame having a pair of traction wheels and a brake for each of the wheels, of a shaft journaled upon the frame, a lever pivoted upon the shaft, separate brake control members carried by the shaft and operatively connected with said brakes, one of said members being rigid upon the shaft and the other movable relative thereto, and independent operating devices pivoted upon the lever adapted to effect simultaneous operation of said members to apply both brakes at the same time and also adapted to afford operation of each independently of the other.

10. The combination with a vehicle frame having a pair of traction wheels and a brake for each of said wheels, of a shaft journaled upon the frame and operatively connected with one of said brakes, a member movable relative to the shaft and operatively connected with the other brake, a lever pivoted upon said shaft, and independent releasable coupling devices pivoted upon and connecting the lever with said member and said shaft to effect simultaneous operation of both brakes and permitting independent operation of said shaft and member whereby to operate one brake without operating the other.

11. The combination with a vehicle frame having a pair of traction wheels and a brake for each of said wheels, of a shaft journaled upon the frame and operatively connected with one of said brakes, a member movable relative to the shaft and operatively connected with the other brake, a lever pivoted upon said shaft, releasable coupling means connecting the lever with said member and said shaft to effect simultaneous operation of both brakes and permitting independent operation of said shaft and member whereby to operate one brake without operating the other, and a locking member for the lever adapted when in locked position to prevent operation of said releasable coupling means.

12. The combination with a vehicle frame having a pair of traction wheels and a brake for each of the wheels, relatively movable brake actuating members connected with said brakes, a manually controlled lever, a latching device for the lever, and independently releasable devices normally coupling the lever with said relatively movable actuating members to effect simultaneous operation of the brakes upon movement of the lever, both of said devices being held against release by the latching device when the latter is in locking position.

13. The combination with a vehicle frame having a pair of traction wheels and a brake for each of the wheels, relatively movable brake actuating members connected with said brakes, a manually controlled lever, coupling devices independently connecting the lever with said relatively movable brake actuating members and adapted when in normal position to effect simultaneous operation of the brakes upon movement of the lever, and means pivotally disposed upon the lever and adapted to effect independent release of said coupling devices to permit either brake to be operated without operating the other.

14. The combination with a vehicle frame having a pair of traction wheels and a brake for each of the wheels, relatively movable brake actuating members connected with said brakes, a manually controlled lever, coupling devices independently connecting the lever with said relatively movable brake actuating members and adapted when in normal position to effect simultaneous operation of the brakes upon movement of the lever, and means pivotally disposed upon the lever and adapted to effect independent release of said coupling devices to permit either brake to be operated without operating the other, and a latching device for the lever adapted when in locking position to prevent the release of said coupling devices.

15. The combination with a vehicle frame having a pair of traction wheels and a brake for each of the wheels, relatively movable brake actuating members connected with said brakes, a lever, separate coupling devices pivoted upon the lever and adapted to connect it with said relatively movable brake actuating members to effect simultaneous operation of both brakes, and means upon the lever for effecting independent release of said coupling devices to permit operation of either brake without operation of the other.

16. The combination with a vehicle frame having a pair of traction wheels and a brake for each of the wheels, relatively movable brake actuating members connected with said brakes, a lever, separate coupling devices pivoted upon the lever and adapted to connect it with said relatively movable brake actuating members to effect simultaneous operation of both brakes, means upon the lever for effecting independent release of said coupling devices to permit operation of either brake without operation of the other, and a latching device for the lever adapted when in locking position to prevent the release of said coupling devices.

17. The combination with a vehicle frame having a pair of traction wheels and a brake for each of the wheels, relatively movable brake actuating members connected with said brakes, a manually controlled lever, separate coupling devices pivoted upon the lever and adapted to connect it with said relatively movable brake actuating members to effect simultaneous operation of both brakes, separate control members pivotally mounted upon said lever, and means operatively connecting said control members with said coupling devices whereby to effect release of either independently of the other to permit independent operation of the brakes.

18. The combination with a vehicle frame having a pair of traction wheels and a brake for each of the wheels, relatively movable brake actuating members connected with said brakes, a manually controlled lever, separate coupling devices pivoted upon the lever adapted to connect it with said relatively movable brake actuating members to effect simultaneous operation of both brakes, separate control members pivotally mounted upon said lever, means operatively connecting said control members with said coupling devices whereby to effect release of either independently of the other to permit independent operation of the brakes, and a latching device upon the lever adapted when in locking position to prevent release of said coupling devices.

19. The combination with a vehicle frame having a pair of traction wheels and a brake for each of the wheels, a transversely extending shaft journaled upon the frame, means connecting the shaft with one of said brakes, a brake lever pivotally disposed upon the shaft and operatively connected with the other brake, a hand lever pivoted upon the shaft, an arm rigid upon the shaft, releasable coupling devices pivoted upon the hand lever and having interlocking engagement with said arm and said brake lever to effect simultaneous operation of both brakes upon movement of the hand lever, and means for effecting release of either of the coupling devices independently of the other whereby either brake may be operated without operation of the other.

20. The combination with a vehicle frame having a pair of traction wheels and a brake for each of the wheels, a transversely extending shaft journaled upon the frame, means connecting the shaft with one of said brakes, a brake lever pivotally disposed upon the shaft and operatively connected with the other brake, a hand lever pivoted upon the shaft, an arm rigid upon the shaft, releasable coupling devices pivoted upon the hand lever and having interlocking engagement with said arm and said brake lever to effect simultaneous operation of both brakes upon movement of the hand lever, means for effecting release of either of the coupling devices independently of the other whereby either brake may be operated without operation of the other, and a latching device for said hand lever adapted when in locking position to prevent release of either of said coupling devices.

FRANK W. PICHÉ.